(12) United States Patent
Kuo et al.

(10) Patent No.: US 12,481,480 B2
(45) Date of Patent: Nov. 25, 2025

(54) COMPUTING METHOD AND COMPUTING DEVICE FOR FLOATING-POINT MATHEMATIC OPERATION USING LOOKUP TABLE

(71) Applicant: Shenzhen Suanhai Technology Co., Ltd., Shenzhen (CN)

(72) Inventors: Yuan-Hsiang Kuo, Hsinchu (TW); Chia-Lin Lu, Hsinchu (TW); Wei-Chun Chang, Taoyuan (TW); Hao-Cing Jhou, New Taipei (TW); Jen-Shi Wu, Zhubei (TW); Tsung-Hsien Lin, Zhubei (TW)

(73) Assignee: Shenzhen Suanhai Technology Co. Ltd., Shenzhen (CN)

( * ) Notice: Subject to any disclaimer, the term of this patent is extended or adjusted under 35 U.S.C. 154(b) by 1000 days.

(21) Appl. No.: 17/507,594

(22) Filed: Oct. 21, 2021

(65) Prior Publication Data

US 2022/0137923 A1     May 5, 2022

(30) Foreign Application Priority Data

Oct. 30, 2020     (CN) .......................... 202011191656.8

(51) Int. Cl.
*G06F 7/487*     (2006.01)
*G06F 7/548*     (2006.01)
*G06F 7/552*     (2006.01)

(52) U.S. Cl.
CPC ............ *G06F 7/4876* (2013.01); *G06F 7/548* (2013.01); *G06F 7/5525* (2013.01)

(58) Field of Classification Search
CPC ...... G06F 7/4876; G06F 7/548; G06F 7/5525; G06F 7/544
USPC .................................. 708/500, 605, 4
See application file for complete search history.

(56) References Cited

U.S. PATENT DOCUMENTS

| | | | |
|---|---|---|---|
| 10,713,013 B1 * | 7/2020 | Old .......................... | G06F 7/556 |
| 2006/0056502 A1 * | 3/2006 | Callicotte .......... | H03H 21/0012 |
| | | | 375/232 |
| 2008/0247652 A1 * | 10/2008 | Mohamed ........... | G06F 18/2411 |
| | | | 382/190 |
| 2009/0037504 A1 * | 2/2009 | Hussain .................. | G06F 7/556 |
| | | | 708/277 |

OTHER PUBLICATIONS

Paresh Kharya, "TensorFloat-32 in the A100 GPU Accelerates AI Training, HPC up to 20x", NVIDIA Blog. May 14, 2020. (Year: 2020).*

(Continued)

*Primary Examiner* — Andrew Caldwell
*Assistant Examiner* — Jonathan David Warner
(74) *Attorney, Agent, or Firm* — Innovation Counsel LLP

(57) ABSTRACT

A computing device for floating-point mathematic operation using look-up table is provided. The computing device includes: a bit arrangement unit used for receiving a floating-point input data and performing a bit arrangement or a format conversion on the floating-point input data to generate multiple index blocks; a first look-up table unit group used for receiving the index blocks and performing look-up operation using the index blocks as index to generate a plurality of look-up table results; and an operation unit used for performing operation on the look-up table results of the first look-up table unit group to generate an operation output.

16 Claims, 5 Drawing Sheets

(56) References Cited

OTHER PUBLICATIONS

Garth Wilson, "Large Look-up Tables for Hyperfast, Accurate, 16-Bit Scaled-Integer Math Plus: The Unexpected Power of Scaled-Integer Math", wilsonminesco.com/16bitMathTables. Feb. 7, 2020. (Year: 2020).*

* cited by examiner

COMPUTING METHOD AND COMPUTING DEVICE FOR FLOATING-POINT MATHEMATIC OPERATION USING LOOKUP TABLE

This application claims the benefit of People's Republic of China application Serial No. 202011191656.8, filed Oct. 30, 2020, the subject matter of which is incorporated herein by reference.

BACKGROUND OF THE INVENTION

Field of the Invention

The invention relates in general to a computing method and a computing device for floating-point mathematic operation using look-up table.

Description of the Related Art

Conventionally, specific mathematical operations employ algorithms such as Taylor expansion, CORDIC algorithm, or approximation algorithm or need to be quantized to int8 operation.

The coordinate rotation digital computer (CORDIC) algorithm evaluates several mathematical functions, such as trigonometric functions, hyperbolic functions and plane rotation problems, through iteration. Through the use of iterative approximation, the CORDIC algorithm can evaluate specific function merely using addition/subtraction and shift operation and is very convenient to be implemented by computers.

However, it is not easy to implement several unique algorithms on a multi-core parallel computing system but is easy to lose accuracy during the process of recursive approximation.

Therefore, the present invention provides a computing device and a computing method for floating-point mathematic operation using look-up table with an aim to implementing various specific operations.

SUMMARY OF THE INVENTION

According to one embodiment of the present invention, a computing device for floating-point mathematic operation using look-up table is provided. The computing device includes: a bit arrangement unit used for receiving a floating-point input data and performing a bit arrangement or a format conversion on the floating-point input data to generate multiple index blocks; a first look-up table unit group used for receiving the index blocks and performing look-up operation using the index blocks as index to generate a plurality of look-up table results; and an operation unit used for performing operation on the look-up table results of the first look-up table unit group to generate an operation output.

According to another embodiment of the present invention, a computing method for floating-point mathematic operation using look-up table is provided. The computing method comprises: receiving a floating-point input data and performing a bit arrangement or a format conversion on the floating-point input data to generate multiple index blocks; receiving the index blocks and performing look-up operation using the index blocks as index to generate a plurality of look-up table results; and performing operation on the look-up table results to generate an operation output.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to generally known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
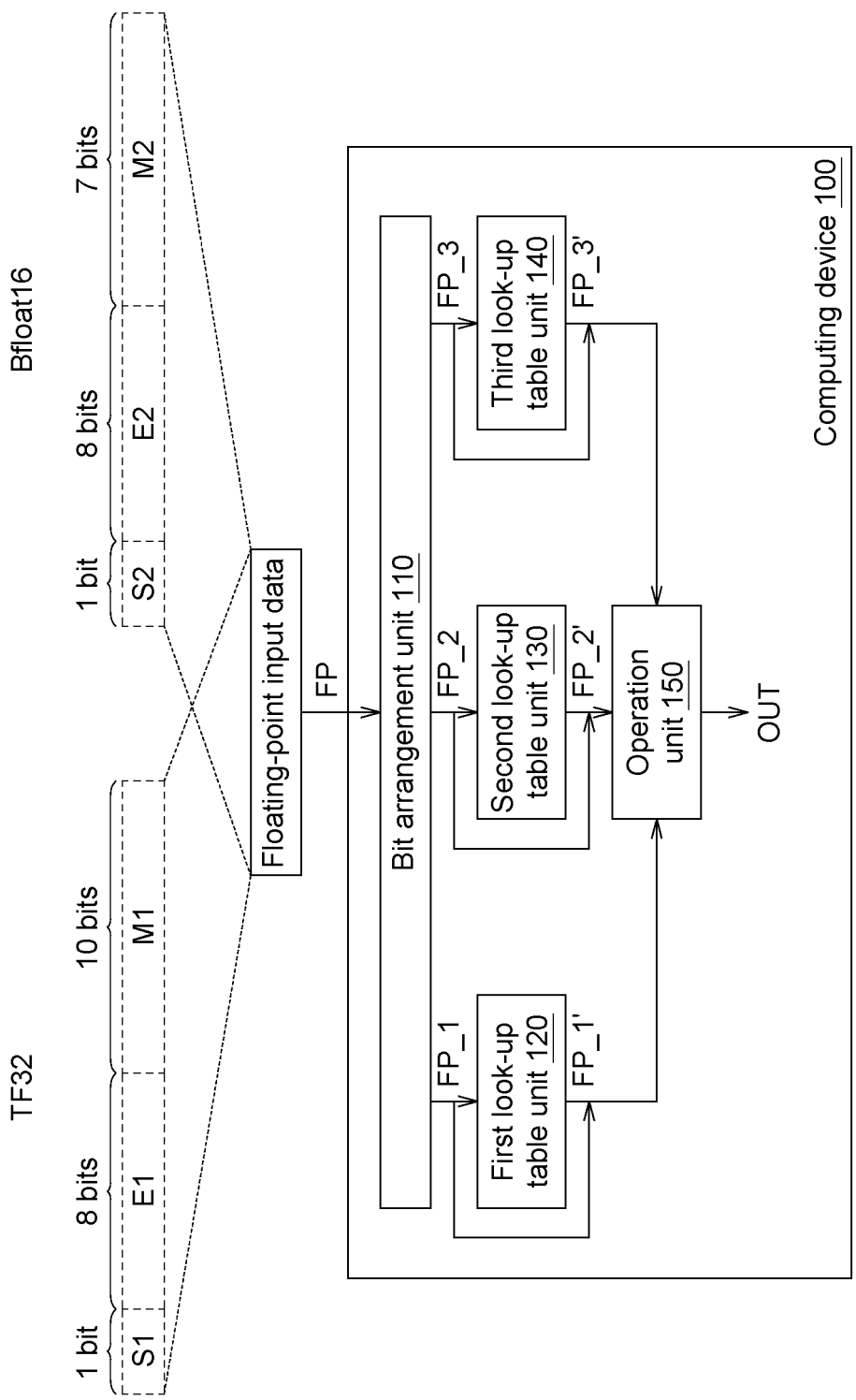
FIG. 1 is a functional block diagram of a computing device for floating-point mathematic operation using look-up table according to an embodiment of the present invention.

Referring to FIG. 1, a functional block diagram of a computing device for floating-point mathematic operation using look-up table according to an embodiment of the present invention is shown. The computing device 100 according to an embodiment of the present invention includes a bit arrangement unit 110, a first look-up table unit 120, a second look-up table unit 130, a third look-up table unit 140, and an operation unit 150.

In an embodiment of the present invention, the floating-point input data FP includes but is not limited to two formats, namely, TensorFloat-32 (TF32) and Bfloat16 (BF16). The format TF32 is a 19-bit format consists of 1-bit sign (S1), 8-bit exponent (E1) and 10-bit mantissa (M1). The format Bfloat16 is a 16-bit format consists of 1-bit sign (S2), 8-bit exponent (E2) and 7-bit mantissa (M2).

The bit arrangement unit 110 receives a floating-point input data FP and performs a bit arrangement or a format conversion on the floating-point input data FP to generate a first index block FP_1, a second index block FP_2, and a third index block FP_3. The look-up table unit group consists of the first look-up table unit 120, the second look-up table unit 130, and the third look-up table unit 140. The first index block FP_1, the second index block FP_2, and the third index block FP_3 from the bit arrangement unit 110 are respectively sent to the first look-up table unit 120, the second look-up table unit 130 and the third look-up table unit 140 for later operations.

The first look-up table unit 120 performs look-up operation using the first index block FP_1 as index to generate a first entry block FP_1' (that is, a look-up table result).

The second look-up table unit 130 performs look-up operation using the second index block FP_2 as index to generate a second entry block FP_2'.

The third look-up table unit 140 performs look-up operation using the third index block FP_3 as index to generate a third entry block FP_3'.

The operation unit 150 performs mathematic operations on the first entry block FP_1', the second entry block FP_2' and the third entry block FP_3' to generate an operation output OUT. The operation performed by the operation unit 150 includes but is not limited to at least one or any combination of addition, subtraction, multiplication, division, and look-up table.

Figure 2:
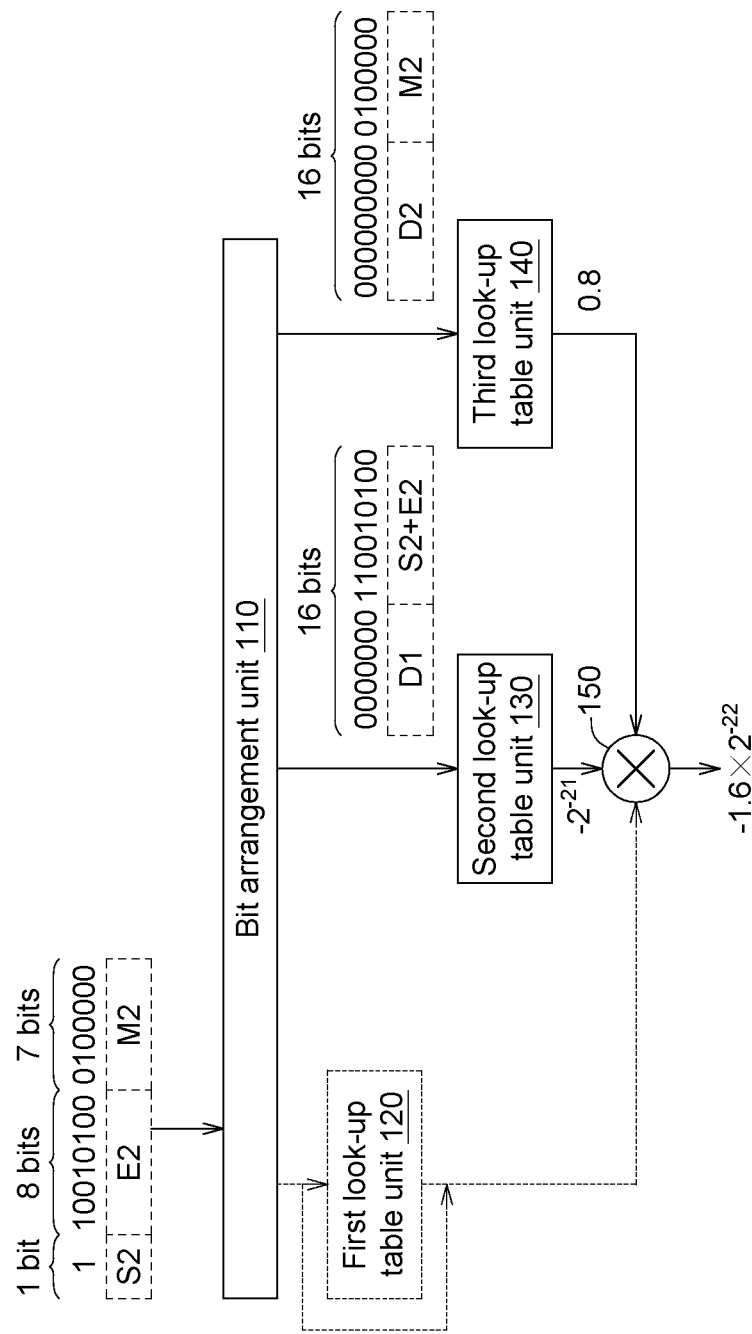
FIG. 2 to FIG. 4 are schematic diagrams of several operations performed by a computing device for floating-point mathematic operation using look-up table according to an embodiment of the present invention.
Figure 3:
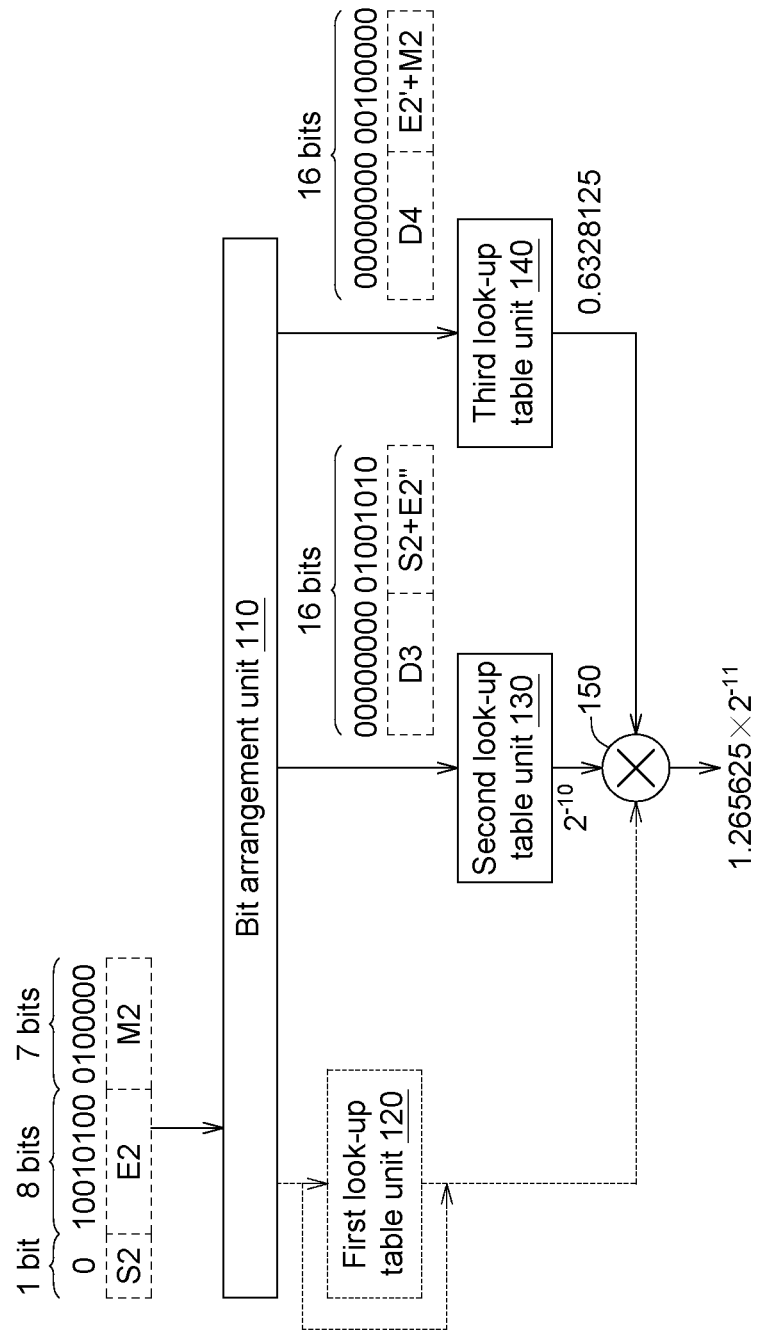
Figure 4:
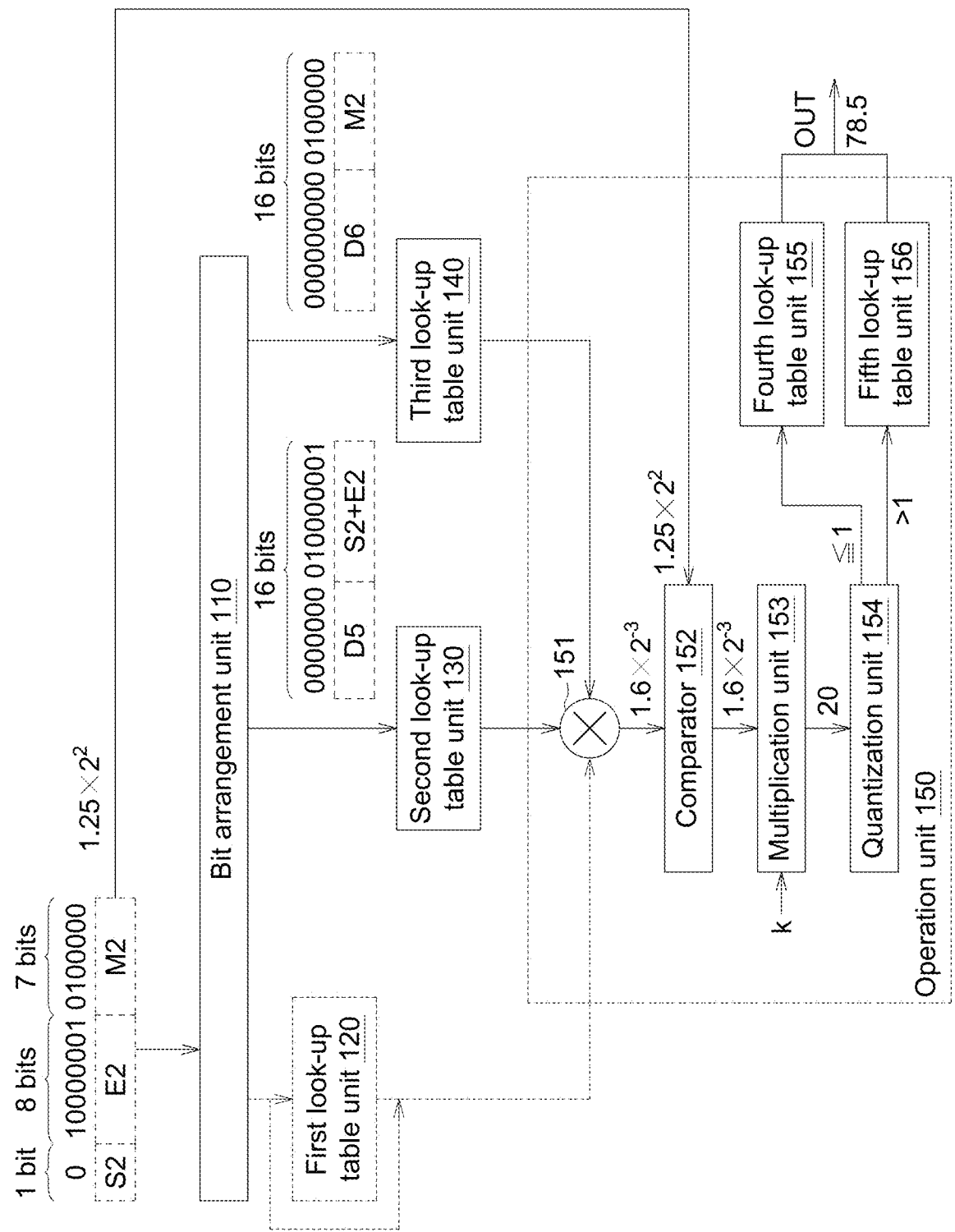

The principles of the operations of the computing device 100 according to an embodiment of the present invention are better understood with accompanying drawings FIG. 2 to FIG. 4. FIG. 2 to FIG. 4 are schematic diagrams of several operations performed by the computing device 100 for floating-point function look-up table operation according to an embodiment of the present invention. FIG. 2 is a schematic diagram of a reciprocal operation performed by the computing device 100 according to an embodiment of the present invention. FIG. 3 is a schematic diagram of a reciprocal square root operation performed by the computing device 100 according to an embodiment of the present invention. FIG. 4 is a schematic diagram of a trigonometric arctan function performed by the computing device 100 according to an embodiment of the present invention.

FIG. 2 is a schematic diagram of a reciprocal operation performed by the computing device 100 according to an embodiment of the present invention. In FIG. 2, the format of the floating-point input data FP is exemplified by Bfloat16, but the present invention is not limited thereto.

In FIG. 2, the operation is for evaluating the reciprocal of $-1.25*221$. The value $-1.25*221$ may be expressed in the format of Bfloat16 as: $-1.25*221$=1100101000100000 (16 bits), wherein the sign S2 has 1 bit (1), the exponent E2 has 8 bits (10010100), and the mantissa M2 has 7 bits (0100000).

Through the bit arrangement or format conversion performed on the floating-point input data FP, the bit arrangement unit 110 generates the first index block FP_1, the second index block FP_2 and the third index block FP_3. For simplicity, it is assumed that the value of the first index block FP_1 is null.

Details of generating the second index block FP_2 and the third index block FP_3 are disclosed below.

The second index block FP_2 includes 16 bits, wherein the dummy part D1 has 7 dummy bits (0000000), and the combination S2+E2 has 9 bits (110010100) composed of a 1-bit sign S2 and an 8-bit exponent E2.

The third index block FP_3 includes 16 bits, wherein the dummy part D2 has 9 dummy bits (000000000), and the mantissa M2 has 7 bits (0100000).

The second index block FP_2 and the third index block FP_3 are respectively inputted to the second look-up table unit 130 and the third look-up table unit 140.

The second look-up table unit 130 performs look-up operation using the second index block FP_2 as index. An example of look-up table result of the second look-up table unit 130 is listed below, but the present invention is not limited thereto:

The second look-up table unit 130:

| Index | Look-up table result |
| --- | --- |
| 0 | infinite |
| 1 | $2^{126}$ |
| 2 | $2^{125}$ |

| Index | Look-up table result |
| --- | --- |
| ... | ... |
| 404 | $-2^{-21}$ |
| ... | ... |

Since the second index block FP_2 is 0000000110010100=404, a value of $-2^{-21}$ is generated through look-up table. That is, the look-up table result of the second look-up table unit 130 is still the reciprocal of the second index block FP_2.

Likewise, the third look-up table unit 140 performs look-up operation using the third index block FP_3 as index. An example of the third look-up table unit 140 is disclosed below, but the present invention is not limited thereto:

The third look-up table unit 140:

| index | look-up table result |
| --- | --- |
| 0 | 1 |
| 1 | 0.9921875 |
| 2 | 0.984375 |
| ... | ... |
| 32 | 0.8 |
| ... | ... |

Since the third index block FP_2 is 0000000000100000=32, a value of 0.8 is generated through look-up table. That is, the look-up table result of the third look-up table unit 140 is a reciprocal of the third index block FP_3.

The operation unit 150 performs an operation (for example but not limited by multiplication operation) on the look-up table result of the second look-up table unit 130 and the look-up table result of the third look-up table unit 140, and an operation output OUT=$(-2^{-21})*0.8=0.8*(-2^{-21})$=$-1.6*(2^{-22})$ is generated.

FIG. 3 is a schematic diagram of a reciprocal square root operation performed by the computing device 100 according to an embodiment of the present invention. In FIG. 3, the format of the floating-point input data FP is exemplified by Bfloat16, but the present invention is not limited thereto.

In FIG. 3, the operation is to evaluate the square root of the reciprocal of $1.25*2^{21}$, and the operation output is $1.25*2^{21}$. The operation output in the format of Bfloat16 is expressed as: $1.25*2^{21}$=0100101000100000 (16 bits), wherein the sign S2 has 1 bit (0), the exponent E2 has 8 bits (10010100), and the mantissa M2 has 7 bits (0100000).

Through the bit arrangement or format conversion performed on the floating-point input data FP, the bit arrangement unit 110 generates the first index block FP_1, the second index block FP_2 and the third index block FP_3. For simplicity, it is assumed that the first index block FP_1 is null.

Details of generating the second index block FP_2 and the third index block FP_3 are disclosed below. When generating the second index block FP_2 and the third index block FP_3, the exponent E2 is shifted, and the details of shifting are disclosed below.

The second index block FP_2 includes 16 bits, wherein the dummy part D3 has 8 dummy bits (00000000), and the combination S2+E" has 8 bits (01001010) including a 1-bit sign S2 and a 7-bit exponent E2" (1001010); and the 7-bit exponent E2" (1001010) is the first 7 bits of the 8-bit exponent E2 (10010100).

The third index block FP_3 includes 16 bits, wherein the dummy part D4 has 8 dummy bits (00000000), and the combination E2'+M2 has 8 bits (00100000) including a 1-bit exponent E2' and a 7-bit mantissa M2, and the 1-bit exponent E2' (0) is the last bit of the 8-bit exponent E2 (10010100).

The second index block FP_2 and the third index block FP_3 are respectively inputted to the second look-up table unit 130 and the third look-up table unit 140.

The second look-up table unit 130 performs look-up operation using the second index block FP_2 as index. An example of the second look-up table unit 130 is disclosed below, but the present invention is not limited thereto:

The second look-up table unit 130:

| Index | Look-up table result |
|---|---|
| 0 | NA |
| 1 | $2^{63}$ |
| 2 | $2^{62}$ |
| ... | ... |
| 74 | $2^{-10}$ |
| ... | ... |

Since the second index block FP_2 is 0000000010010100=74, a value of $2^{-10}$ is generated through look-up table. The look-up table result of the second look-up table unit 130 is a square root of the reciprocal of the second index block FP_2.

Likewise, the third look-up table unit 140 performs look-up operation using the third index block FP_3 as index. An example of the third look-up table unit 140 is disclosed below, but the present invention is not limited thereto:

The third look-up table unit 140:

| Index | Look-up table result |
|---|---|
| 0 | 0.70703125 |
| 1 | 0.703125 |
| 2 | 0.703125 |
| ... | ... |
| 32 | 0.6328125 |
| ... | ... |

Since the third index block FP_2 is 0000000000100000=32, a value of 0.6328125 is generated through look-up table. That is, the look-up table result of the third look-up table unit 140 is a square root of the reciprocal of the third index block FP_3.

The operation unit 150 performs an operation (for example but not limited by multiplication operation) on the look-up table result of the second look-up table unit 130 and the look-up table result of the third look-up table unit 140, and an operation output OUT=$(2^{-10})$*0.6328125=1.265625*$(2^{-11})$ is generated.

FIG. 4 is a schematic diagram of a trigonometric arctan function performed by the computing device 100 according to an embodiment of the present invention. In FIG. 4, the format of the floating-point input data FP is exemplified by Bfloat16, but the present invention is not limited thereto.

In FIG. 4, the operation is to evaluate the trigonometric arctan function of $1.25*2^2$. The $1.25*2^2$ in the format of Bfloat16 is expressed as: $1.25*2^2$=0100000010100000 (16 bits), wherein the sign S2 has 1 bit (0), the exponent E2 has 8 bits (10000001), and the mantissa M2 has 7 bits (0100000).

When evaluating the trigonometric arctan function, its reciprocal is generated first (reasons are disclosed below). The reciprocal can be evaluated with reference to the above embodiments and are not repeated here. The reciprocal of $1.25*2^2$ can be evaluated as $1.6*2^{-3}$.

In FIG. 4, the operation unit 150 includes a multiplication unit 151, a comparator 152, a multiplication unit 153, a quantization unit 154, a fourth look-up table unit 155 and a fifth look-up table unit 156. The fourth look-up table unit 155 and the fifth look-up table unit 156 together form the second look-up table unit group.

The multiplication unit 151 multiplies the look-up table result of the second look-up table unit 130 with the look-up table result of the third look-up table unit 140 to generate a first multiplication output.

The comparator 152 compares the floating-point input data FP with its reciprocal to generate a comparison result. In a possible example, the comparison result is the smaller one of the floating-point input data FP and its reciprocal. In the present example, the floating-point input data FP is $1.25*2^2$ and its reciprocal is $1.6*2^{-3}$, therefore the comparator 152 outputs the reciprocal ($1.6*2^{-3}$).

The multiplication unit 153 multiplies the comparison result of the comparator 152 by a constant "k" to generate a second multiplication output. Exemplarily but not restrictively, the constant is 100. In the above example, the second multiplication output is 100*(1.6*2−3)=20.

The quantization unit 154 performs integer-quantization operation on the second multiplication output of the multiplication unit 153 to generate a quantization output. If the quantization output of the quantization unit 154 is less than or equivalent to 1, the fourth look-up table unit 155 performs look-up operation using the quantization output of the quantization unit 154 as index. If the quantization output of the quantization unit 154 is greater than 1, the fifth look-up table unit 156 performs look-up operation using the quantization output of the quantization unit 154 as index.

In the present example, since the quantization output of the quantization unit 154 is greater than 1, the fifth look-up table unit 156 performs look-up operation. Likewise, the fifth look-up table unit 156 performs look-up operation using the quantization output of the quantization unit 154 as index. An example of the fourth look-up table unit 155 and the fifth look-up table unit 156 is disclosed below, but the present invention is not limited thereto:

The fourth look-up table unit 155:

| Index | Look-up table result |
|---|---|
| 0 | 0 |
| 1 | 0.57421875 |
| 100 | 45 |
| ... | ... |

The fifth look-up table unit 156:

| Index | Look-up table result |
|---|---|
| 0 | 90 |
| ... | ... |
| 20 | 78.5 |
| 100 | 45 |
| ... | ... |

The result generated by the fifth look-up table unit 156 performing look-up operation using the quantization output of the quantization unit 154 (20) as index is 78.5, and an operation output OUT=78.5 is generated. Thus, the trigonometric arctan function (1.25*2$^2$) is evaluated as 78.5.

Figure 5A:
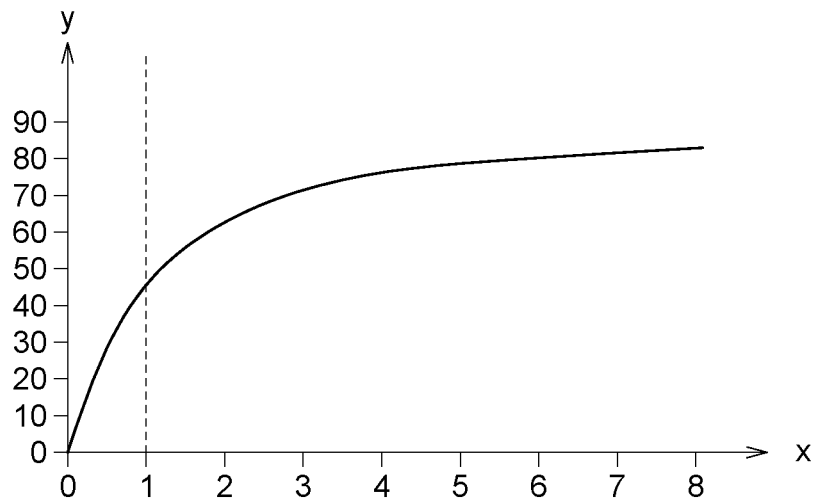
FIG. 5A is a relationship chart of a trigonometric arctan function.
Figure 5B:
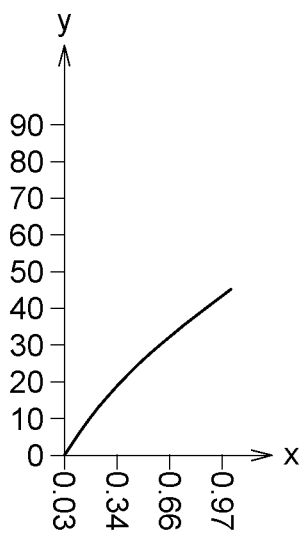
FIG. 5B and FIG. 5C are index and look-up table result of two look-up table units according to an embodiment of the present invention.
Figure 5C:
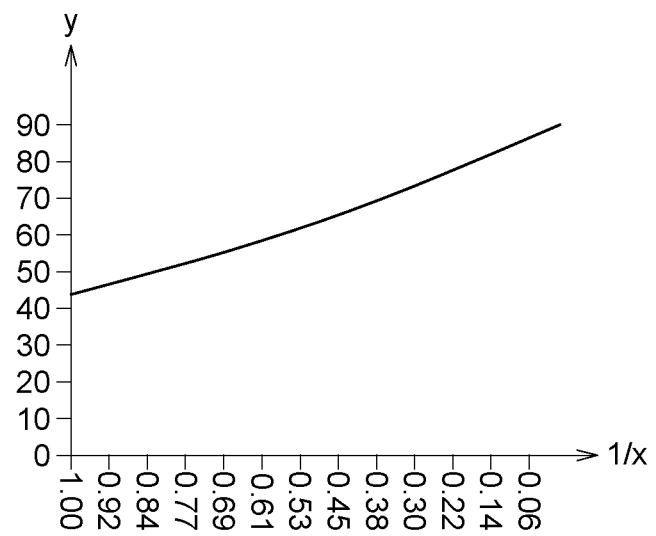

FIG. 5A is a relationship chart of a trigonometric arctan function. FIG. 5B is a relationship chart of index and look-up table result of the fourth look-up table unit 155. FIG. 5C is a relationship chart of index and look-up table result of the fifth look-up table unit 156.

As indicated in FIG. 5A, the value of the trigonometric arctan function (y value) reaches saturation slowly. When x is less than 1, the value (y value) of trigonometric arctan function shows a linear relationship; when x is greater than 1, the value (y value) of the trigonometric arctan function shows a reciprocal relationship.

In an embodiment of the present invention, when designing the fourth look-up table unit 155, the relationship between the index and the look-up table result of the fourth look-up table unit 155 is regarded as a linear relationship as indicated in FIG. 5B. When designing the fifth look-up table unit 156, the relationship between the index and the look-up table result of the fifth look-up table unit 156 is regarded as a non-linear relationship (or, the relationship between the reciprocal (1/x) of the index and the look-up table result of the fifth look-up table unit 156 is regarded as a linear relationship) as indicated in FIG. 5C.

In an embodiment of the present invention, the smaller one of the floating-point input data FP and its reciprocal is generated first, and subsequent operation, based on the smaller one of the floating-point input data FP and its reciprocal, is performed to evaluate the trigonometric arctan function through look-up table.

The computing device disclosed in above embodiments of the present invention can be used in several fields including but not limited to computer vision application AI training, and AI inference.

The computing device disclosed in above embodiments of the present invention can perform specific operations in the absence of CPU, and therefore greatly reduces the cost required for performing the specific operation.

The computing device disclosed in above embodiments of the present invention can be used in a multi-core parallel computing system.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computing device for floating-point mathematic operation using look-up table, comprising:
   a first look-up table unit group used for receiving a plurality of index blocks and performing look-up operation using the index blocks as index to generate a plurality of look-up table results, wherein a bit arrangement or a format conversion is performed on a floating-point input data to generate the plurality of index blocks, a second index block of the index blocks including a plurality of first dummy bits and a combination of a sign and an exponent of the floating-point input data, and a third index block of the index blocks including a plurality of second dummy bits and a mantissa of the floating-point input data; and
   an operation unit used for performing operation on the look-up table results of the first look-up table unit group to generate an operation output.

2. The computing device for floating-point mathematic operation using look-up table according to claim 1, wherein the floating-point input data comprises a plurality of formats.

3. The computing device for floating-point mathematic operation using look-up table according to claim 1, wherein the formats of the floating-point input data comprise TensorFloat32 and Bfloat16.

4. The computing device for floating-point mathematic operation using look-up table according to claim 1, wherein the operation performed by the operation unit comprises at least one or any combination of addition, subtraction, multiplication, division, and look-up table.

5. The computing device for floating-point mathematic operation using look-up table according to claim 1, wherein the floating-point input data comprises a plurality of bytes, and at least one of the index blocks comprises a plurality of dummy bits and the bytes of the floating-point input data.

6. The computing device for floating-point mathematic operation using look-up table according to claim 1, wherein the operation unit comprises:
   a first multiplication unit used for performing multiplication on the look-up table results of the first look-up table unit group to generate a first multiplication output;
   a comparator used for comparing the first multiplication output with the floating-point input data to output a comparison result;
   a second multiplication unit used for multiplying the comparison result of the comparator with a constant to generate a second multiplication output, wherein integer-quantization operation is performed on the second multiplication output of the multiplication unit to generate a quantization output; and
   a second look-up table unit group used for performing look-up operation using the quantization output of the quantization unit as index to generate the operation output.

7. The computing device for floating-point mathematic operation using look-up table according to claim 6, wherein the comparison result of the comparator is a smaller one of the first multiplication output and the floating-point input data.

8. The computing device for floating-point mathematic operation using look-up table according to claim 6, wherein the computing device selects one look-up table unit from the second look-up table unit group according to whether the quantization output of the quantization unit is less than or equivalent to 1, and the selected look-up table unit performs look-up operation using the quantization output of the quantization unit as index to generate the operation output.

9. A computing method for floating-point mathematic operation using look-up table, comprising:
   receiving a floating-point input data and performing a bit arrangement or a format conversion on the floating-point input data to generate multiple index blocks, a second index block of the index blocks including a plurality of first dummy bits and a combination of a sign and an exponent of the floating-point input data, and a third index block of the index blocks including a plurality of second dummy bits and a mantissa of the floating-point input data;

receiving the index blocks and performing look-up operation using the index blocks as index to generate a plurality of look-up table results; and performing operation on the look-up table results to generate an operation output.

10. The computing method for floating-point mathematic operation using look-up table according to claim 9, wherein the floating-point input data comprises a plurality of formats.

11. The computing method for floating-point mathematic operation using look-up table according to claim 9, wherein the formats of the floating-point input data comprise TensorFloat32 and Bfloat16.

12. The computing method for floating-point mathematic operation using look-up table according to claim 9, wherein the operation performed on the look-up table results comprises at least one or any combination of addition, subtraction, multiplication, division, and look-up table.

13. The computing method for floating-point mathematic operation using look-up table according to claim 9, wherein the floating-point input data comprises a plurality of bytes, and at least one of the index blocks comprises a plurality of dummy bits and the bytes of the floating-point input data.

14. The computing method for floating-point mathematic operation using look-up table according to claim 9, wherein the operation performed on the look-up table results comprising:

performing multiplication on the look-up table results to generate a first multiplication output;

comparing the first multiplication output with the floating-point input data to output a comparison result;

multiplying the comparison result with a constant to generate a second multiplication output;

performing integer-quantization operation on the second multiplication output to generate a quantization output; and performing look-up operation using the quantization output as index to generate the operation output.

15. The computing method for floating-point mathematic operation using look-up table according to claim 14, wherein the comparison result is a smaller one of the first multiplication output and the floating-point input data.

16. The computing method for floating-point mathematic operation using look-up table according to claim 14, wherein a look-up table unit is selected according to whether the quantization output is less than or equivalent to 1, and the selected look-up table unit performs look-up operation using the quantization output as index to generate the operation output.

* * * * *